Patented Oct. 4, 1949

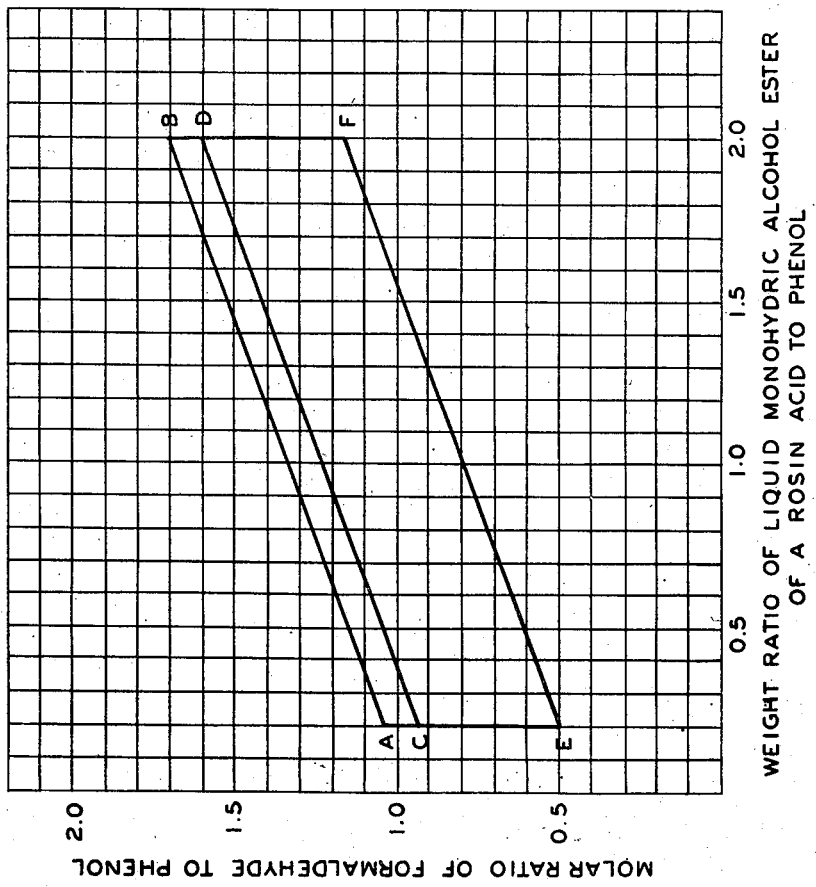

2,483,468

UNITED STATES PATENT OFFICE 2,483,468

SYNTHETIC RESIN AND PRINTING INK COMPOSITION CONTAINING THE SAME

William D. Jones, West Lafayette, Ind., assignor to Hercules Powder Company, Wilmington, Del., a corporation of Delaware Application January 30, 1947, Serial No. 725,208

8 Claims. (Cl. 260—25)

This invention relates to improved synthetic resins and to methods for the production thereof. It also relates to printing ink compositions containing such resins which are capable of being precipitated or set with water or steam (hereinafter referred to as moisture-setting printing inks). More particularly, this invention relates to improved synthetic resins having unique characteristics derived from phenol, formaldehyde and a liquid monohydric alcohol ester of a rosin acid, and to moisture-setting printing ink compositions containing the same.

It has been known to condense a phenol substituted in the para position with an alkyl radical such as the tertiary butyl radicle with formaldehyde to prepare drying oil-soluble resins and to further react the resulting condensates with ester gum to prepare drying oil-soluble reaction products, see U. S. 1,800,295 to Honel. It is furthermore known to react drying oil-soluble phenol-aldehyde condensates with liquid esters of rosin to provide resinous products characterized by excellent solubility in drying oil and the usual varnish solvents, see U. S. 2,227,548 to Long. Liquid esters of rosin such as the methyl ester have also been employed in conjunction with phenolaldehyde condensates where the rosin ester plays the role of a simple plasticizing ingredient unreacted with the phenolic condensate as described in U. S. 2,380,599 to Kline.

It has now been found that reaction products of very unusual characteristics, as compared with the resins of the aforesaid patents and the prior art generally, result from the simultaneous reaction of phenol, formaldehyde and a liquid monohydric alcohol ester of a rosin acid under certain specific conditions. Broadly, the process of preparing these novel synthetic resins involves reacting simultaneously phenol, formaldehyde and a liquid monohydric alcohol ester of a rosin acid in the presence of an acid condensation catalyst, at a temperature sufficiently high to cause an exothermic reaction to take place and for such a period that substantially all the formaldehyde has reacted. The molar ratio of formaldehyde to phenol and the weight ratio of rosin ester to phenol are critical and are defined by the area ABEF of Figure 1. After the formaldehyde has been substantially completely reacted, the reaction product is dehydrated by heating until a product is obtained which is a hard resin at normal room temperature (21° C.).

It is preferred to carry out the above reaction in an aqueous medium. The presence of water is desirable both from the standpoint of providing a co-solvent for the formaldehyde and the phenol and from the standpoint of control of the reaction. The use of an aqueous medium, however, requires a comparatively longer period to effect dehydration of the reaction mixture to provide the ultimate hard resin.

The resins prepared in this manner are characterized by solubility in ethyl alcohol. They are also soluble in dipropylene glycol and exhibit solubility in varying degrees in other alkylene glycols and polyalkylene glycols, for example ethylene glycol, diethylene glycol, triethylene glycol, propylene glycol, etc. The resins can be speedily precipitated or set from such alkylene or polyalkylene glycol solutions of the resins by the use of water or steam. These characteristics of the resin combine to make the resins uniquely useful in the field of moisture-setting printing inks. The resins are particularly interesting in this use since they are substantially neutral, i. e., possess substantially no carboxyl acidity, and do not react with normally reactive pigments such as peacock blue, orange mineral, etc. The resins are distinguished in this respect from the resins used commercially in this art which are all of a highly acidic nature.

The resins are at the same time additionally distinguished from the prior art resins in that they are entirely insoluble in drying oils such as linseed oil, and in both aromatic and aliphatic hydrocarbons. They are, however, compatible with ethyl cellulose, cellolose acetate, polyvinyl acetate and polyvinyl butyral. Some of the resins are compatible with nitrocellulose.

Referring now to Figure 1, the area ABEF defines the proportions of ingredients which must be employed to obtain resins having the characteristics above-mentioned. This area is subdivided into areas ABCD and area CDEF. Resins prepared on the basis of ingredient proportions as defined by the area CDEF are essentially thermoplastic in nature, and are the preferred resins of this invention. Resins prepared on the basis of ingredient proportions as defined by the area ABCD are essentially thermosetting in nature and can usually be cured to an insoluble, infusible state by heating at 250° C. or above.

Having thus indicated in a general way the nature and purpose of this invention, the following examples are offered to illustrate the practice thereof.

*Example 1*

A resin was prepared on the basis of the following formulation:

| | | Parts |
|---|---|---|
| (A) | 100% phenol | 94.0 |
| (B) | 50% aqueous formaldehyde | 60.0 |
| (C) | Butanol | 100.0 |
| (D) | Methyl ester of wood rosin | 47.0 |
| (E) | 25% aqueous oxalic acid | 15.0 |

Ingredients A, B and D were charged into a three-neck flask equipped with an agitator, a reflux condenser, a thermometer and a dropping funnel. The charge was heated to 100° C. and E was then added. The heat source was removed to control the exothermic reaction. When the reaction had subsided, heat was applied to maintain a temperature of 100° C. for three hours. At this point, the reaction mixture contained 0.17% uncombined formaldehyde (as determined by polarograph analysis). The reaction mixture was then dissolved in C and the resulting solution was distilled to remove the azeotropes, water and butanol. Distillation was continued until the resin in the flask reached a temperature of 250° C. At this point, the pressure was reduced to 50 mm. of mercury absolute and heating was continued at 250° C. until a resin having a melting point by the drop method of 120–125° C. resulted.

This resin was characterized by solubility in ethyl alcohol, dipropylene glycol, diethylene glycol and propylene glycol. It was insoluble in linseed oil and gasoline. It was found to have virtually no acidity (acid number less than 1.0). It was compatible with ethyl cellulose, but incompatible with nitrocellulose (½ sec. viscosity). It retained its shape in 2% aqueous sodium hydroxide solution.

*Example 2*

A resin was prepared on the basis of the following formulation:

| | | Parts |
|---|---|---|
| (A) | 100% phenol | 94.0 |
| (B) | 50% aqueous formaldehyde | 78.0 |
| (C) | Methyl ester of wood rosin | 94.0 |
| (D) | Butanol | 266.0 |
| (E) | 35% aqueous oxalic acid | 10.6 |

Ingredients A, B and C were charged into the equipment described in Example 1. The charge was heated to 100° C. and ingredient E then added. Heating was discontinued to control the exothermic reaction. When the reaction subsided, heat was again applied to maintain a temperature of 100° C. for five hours. The reaction mixture at this point showed a 1.0% uncombined formaldehyde content as determined by polarograph analysis. It was then dissolved in D, and the resulting solution distilled to remove the azeotropes, water and butanol. Distillation was continued until the temperature of the resin in the flask reached 200° C., at which point the pressure was reduced to 50 mm. of mercury absolute. The resin was maintained under these conditions at 200° C. until a resin having a melting point by the drop method of 120° C. was obtained.

This resin was characterized by solubility in ethyl alcohol and dipropylene glycol. It was also soluble in diethylene glycol and in propylene glycol. It was insoluble in drying oils such as linseed oil, and insoluble in both aromatic and aliphatic hydrocarbons. It was compatible with ethyl cellulose but incompatible with nitrocellulose of ½ sec. viscosity. The resin was found to have good resistance to 2% aqueous sodium hydroxide solution.

*Example 3*

A resin was prepared on the basis of the following formulation:

| | | Parts |
|---|---|---|
| (A) | 100% phenol | 94.0 |
| (B) | Paraformaldehyde | 45.0 |
| (C) | Methyl ester of wood rosin | 188.0 |
| (D) | Water | 100.0 |
| (E) | Oxalic acid | 3.8 |
| (F) | Butanol | 225.0 |

Ingredients A, B, C, D and E were charged into the equipment described in Example 1. The charge was heated to 100° C. and held at this temperature for about 5 hours. The reaction mixture was then dissolved in ingredient F and the resulting solution distilled to remove the azeotropes, water and butanol. Distillation was continued until the resin in the flask attained a temperature of 250° C. At this point, the pressure was reduced to 50 mm. of mercury absolute and heating at 250° C. was continued until a resin having a drop melting point of 85° C. was obtained.

This resin was characterized by solubility in ethyl alcohol and dipropylene glycol. However, it was insoluble in ethylene glycol, diethylene glycol and propylene glycol. The resin was also insoluble in drying oils such as linseed oil and in aromatic and aliphatic hydrocarbons.

*Example 4*

A resin was prepared on the basis of the following formulation:

| | | Parts |
|---|---|---|
| (A) | 88% phenol | 107.0 |
| (B) | 37% aqueous formaldehyde | 81.0 |
| (C) | Methyl ester of wood rosin | 47.0 |
| (D) | 50% aqueous HCl | 5.6 |

Ingredients A, B and C were charged into the equipment described in Example 1. The charge was heated to 100° C. and ingredient D added. Heat was supplied as needed to maintain a temperature of 100° C. for about 1½ hours. At this point, the reaction mixture had an uncombined formaldehyde content of 0.05%.

This reaction mixture was dehydrated by allowing it to flow in a small stream through a pyrex glass tube, approximately 4 feet in length and 1 inch in diameter, a nitrogen atmosphere being maintained within the tube. Sufficient heat was supplied to the tube such that the exit temperature of the resin was about 200° C. Under these conditions, the reaction mixture was completely dehydrated in one pass through the tube to provide a resin having a melting point by the drop method of about 110° C.

The solid resin so produced was characterized by light color, solubility in ethyl alcohol and solubility in dipropylene glycol. It was also soluble in diethylene glycol and propylene glycol. It was insoluble in drying oils such as linseed oil and in aliphatic and aromatic hydrocarbons.

The resin was found to have virtually no carboxyl acidity (acid number less than 1.0).

Example 5

A resin was prepared on the basis of the following formulation:

|   | Parts |
|---|---|
| (A) 100% phenol | 94.0 |
| (B) Paraformaldehyde | 30.0 |
| (C) Methyl ester of wood rosin | 47.0 |
| (D) Powdered oxalic acid | 3.7 |

All the ingredients were charged into the equipment described in Example 1. The charge was heated to 100° C. and maintained at this temperature for 3 hours. At this point, the reaction mixture contained 0.05% uncombined formaldehyde (as determined by polarograph analysis). The resin was dehydrated by slowly heating the same to 250° C. When this temperature was reached, the pressure was reduced to 50 mm. of mercury absolute and heating was continued at 250° C. until a resin having a melting point by the drop method of 120–125° C. resulted. This resin had substantially the same properties as those of the resin of Example 1.

Example 6

A resin was prepared on the basis of the following formulation:

|   | Parts |
|---|---|
| (A) 100% phenol | 94.0 |
| (B) 50% aqueous formaldehyde | 51.0 |
| (C) Methyl ester of wood rosin | 19.0 |
| (D) 35% aqueous oxalic acid | 10.6 |
| (E) Butanol | 100.0 |

Ingredients A, B and C were charged into the equipment described in Example 1. The charge was treated substantially as described in Example 1. The final resin had a melting point by the drop method of 119° C. It was characterized by solubility in ethyl alcohol and dipropylene glycol, and was found to have virtually no acidity.

Example 7

A resin was prepared on the basis of the following formulation:

|   | Parts |
|---|---|
| (A) 100% phenol | 94.0 |
| (B) 50% aqueous formaldehyde | 48.0 |
| (C) Methyl ester of wood rosin | 75.2 |
| (D) 35% aqueous oxalic acid | 10.6 |
| (E) Butanol | 217.0 |

Ingredients A, B and C were charged into the equipment described in Example 1. The charge was heated to 100° C. and D then added. The heat source was removed to control the exothermic reaction. When the reaction had subsided, heat was applied to maintain a temperature of 100° C. for 5 hours. At this point, the reaction mixture contained 0.1% uncombined formaldehyde. The reaction mixture was then dissolved in E and the resulting solution distilled to remove the azeotropes. Distillation was continued until the resin in the flasks reached a temperature of 250° C. At this point, the pressure was reduced to 50 mm. of mercury absolute and heating was continued at 250° C. until a resin having a melting point by the drop method of 70–75° C. was obtained. It was soluble in ethyl alcohol and dipropylene glycol.

Aqueous formaldehyde has been used in most of the examples. It is not necessary to use monomeric formaldehyde, however, as illustrated by Example 3. Any polymers of formaldehyde such as paraformaldehyde, etc., which under the conditions of this reaction break down to yield free formaldehyde may be employed equally well. It will be understood that the term "formaldehyde" as used herein and in the claims embraces such obvious equivalents of monomeric formaldehyde.

As explained previously, water is usually employed in the first step of the resin-forming reaction, although not necessarily. When used, it is normally introduced with the formaldehyde as an aqueous solution thereof. When formaldehyde polymers such as paraformaldehyde are employed, water can be added to the reaction mixture. The amount of water employed in either event is not critical. To enable effective control of the reaction, the amount of water employed is usually between about 10% and about 100% of the combined weight of the phenol and formaldehyde. When too much water is present, the reaction is unduly slow.

The reaction is effected in the presence of a condensation catalyst which may be any of the acid catalysts which are known to the art to effect the reaction of phenols and aldehydes. Either inorganic or organic acids may be employed. For example, inorganic acids such as sulfuric acid, hydrochloric acid, phosphoric acid, boric acid, etc., or the inorganic salts thereof which in aqueous solution give an acid reaction as for example iron chloride, zinc chloride, aluminum chloride, sodium acid sulphate, potassium acid sulphate, etc., may be employed. Typical organic acids which may be employed are oxalic acid, maleic acid, maleic anhydride, acetic acid, lactic acid, salicylic acid, alkyl sulphonic acids, aryl sulphonic acids, etc. The use of oxalic acid is preferred since it provides particularly light colored resins and permits the reaction to be readily controlled.

The amount of acid catalyst employed is not critical and any amount which is known to the art to be effective in the condensation of phenol and aldehydes may be employed. The preferred amount of catalyst to employ in the case of inorganic acid catalysts is from about 0.5% to about 5.0% based on the weight of the phenol. With organic acid catalysts, the preferred amount is from about 0.5% to about 6.0% based on the weight of the phenol. Where inorganic acid catalysts are employed, and particularly where the amount of such catalysts employed is greater than 3% based on the phenol, it is desirable to remove the catalyst from the reaction product prior to dehydration. Otherwise, there is a pronounced tendency for the formation of dark-colored resins.

The examples have illustrated the use of the preferred methyl ester of rosin in the formation of the desired resin. Broadly, however, any monohydric alcohol ester of a rosin acid may be employed provided the ester exists as a liquid at normal room temperature (21° C.). Thus, for example, the rosin acid esters of methyl, ethyl, propyl, isopropyl, butyl, etc., alcohols may be employed. As rosin acids in the formation of these esters there may be employed wood rosin, gum rosin, or any of the rosin acids obtainable from such rosins as for example abietic, 1-pimaric, d-pimaric, sapinic, etc., acids. Furthermore, the rosin ingredient may be employed in the crude or refined form such as rosins refined by distillation, heat-treatment, extraction with selective solvents to remove color bodies, etc. It will be understood that the term "rosin acid" as used herein and in the claims embraces all such equivalents.

Referring to Figure 1, the area ABEF defines the proportions of ingredients to employ to provide resins having the novel characteristics described herein. Thus, the molar ratio of formaldehyde to phenol may be varied from 0.50 to 1.70, and the weight ratio of liquid monohydric alcohol ester of a rosin acid to phenol may be varied from 0.20 to 2.00. All resins prepared on the basis of formulations defined by the area ABEF are hard resins characterized by solubility in ethyl alcohol and dipropylene glycol. They are insoluble in drying oils such as linseed oil and in both aromatic and aliphatic hydrocarbons. The use of formulations substantially above the line AB results in gelation of the resin to the infusible, insoluble state during preparation. Resins based on formulations substantially to the right of the line BF do not possess the unique solubility characteristics above-mentioned. Hard resins do not result when formulations substantially below the line EF are employed. Resins resulting from the use of formulations to the left of line AE are impractical in that they cannot be set or precipitated with moisture from their glycol solutions fast enough to enable their use in commercial applications such as moisture-setting printing ink compositions. Such resins are also characterized by poor initial color and poor color retention both of which factors are deterrents to their commercial application.

It will be noted that area ABEF is subdivided into areas ABCD and CDEF. Resins based on formulations defined by area ABCD are essentially of a thermosetting nature and can be converted to the infusible, insoluble state by heating at temperatures above 250° C. for a short period of time. The points which define this area are the following:

|   | Molar Ratio of Formaldehyde to Phenol | Weight Ratio of Ester to Phenol |
|---|---|---|
| (A) | 1.04 | 0.20 |
| (B) | 1.70 | 2.00 |
| (C) | 0.93 | 0.20 |
| (D) | 1.60 | 2.00 |

Resins based on formulations defined by the area CDEF are essentially thermoplastic in nature and constitute the preferred resins of the invention.

The points which define this area are the following:

|   | Molar Ratio of Formaldehyde to Phenol | Weight Ratio of Ester to Phenol |
|---|---|---|
| (C) | 0.93 | 0.20 |
| (D) | 1.60 | 2.00 |
| (E) | 0.50 | 0.20 |
| (F) | 1.16 | 2.00 |

The resins of this invention can be modified to a minor extent by the addition of a small proportion of rosin in their preparation. For example, up to 15% rosin, based on the liquid rosin acid ester, may be employed without adversely affecting the desirable properties described previously. Rosin modification has the effect of improving somewhat the clarity of solutions of the resins in the lower glycols as for example ethylene glycol. But at the same time it introduces carboxyl acidity which may not be desired.

In the first step of resin preparation, the ingredients are heated at a temperature sufficiently high to cause an exothermic reaction to take place. The minimum temperature to effect such reaction varies somewhat with the proportions and types of ingredients, also with the amount and type of catalyst employed. It is preferred to carry out this first step at a temperature of from about 85° C. to about 150° C. Still further preferred temperatures are from about 95° C. to about 103° C. Heating is continued until the formaldehyde has been substantially entirely reacted, for example, until the reaction mixture has a free formaldehyde content of not more than 1.0%.

In the second step of resin preparation, i. e., dehydration, the reaction mixture is heated at a temperature sufficiently high to effect dehydration, heating being continued until a product is obtained which is a hard resin at normal room temperature (21° C.). Subatmospheric pressure may be employed, if desired. From a practical standpoint, however, atmospheric pressure and a temperature above 100° C. are more desirable. In preparing resins on the basis of ingredient proportions defined by area CDEF of Figure 1, it is preferred to employ atmospheric pressure and a maximum dehydration temperature of from about 200° C. to about 350° C., and still further preferred to employ a maximum temperature of from about 250° C. to about 280° C. In preparing resins on the basis of ingredient proportions defined by area ABCD of Figure 1, it is preferred to employ atmospheric pressure and a maximum dehydration temperature of from about 150° C. to about 250° C., and still further preferred to employ a temperature of from about 180° C. to about 220° C.

While dehydration can be accomplished satisfactorily by simply heating the reaction mixture at an elevated temperature, a practical difficulty is encountered due to excessive foaming. It is accordingly much preferred to dehydrate the reaction mixture by dissolving the same in a lower aliphatic monohydric alcohol of from 4 to 6 carbon atoms and distilling off the azeotropes, water and alcohol. The amount of alcohol which must be used will be determined largely by the amount of water present in the original reaction mixture. The use of n-butyl alcohol is uniquely advantageous for this purpose and is preferred. The azeotropic distillation may be followed by heating of the reaction mixture under vacuum until a hard resin of the desired melting point has been achieved. Example 4 exemplifies a means of dehydration which does not involve the use of azeotropic distillation.

The products of this invention are all hard resins of a thermoplastic or thermosetting nature. They are soluble in ethyl alcohol and in dipropylene glycol. They also exhibit solubility in varying degrees in other alkylene glycols and polyalkylene glycols, for example, ethylene glycol, diethylene glycol, triethylene glycol, propylethylene glycols, etc. At the same time, they are insoluble in drying oils such as linseed oil, in aliphatic hydrocarbons such as gasoline and in aromatic hydrocarbons such as xylene. The resins can be speedily precipitated or "set" from their glycol solutions by the use of water or steam. Being substantially neutral, i. e., having an acid number less than 1, they are nonreactive with basic pigments. The resins possess a high range of compatibility with other film-forming materials as for example ethyl cellulose, cellulose acetate, polyvinyl acetate and polyvinyl butyral. Certain of the resins, particularly those prepared on the basis of comparatively low molar ratios of formaldehyde to phenol possess nitrocellulose compatibility. The resins prepared from comparatively high molar ratios of formaldehyde to phenol possess good resistance to alkalies.

Due to the unique properties of the resins of this invention they are particularly useful in the preparation of moisture-setting printing inks. The following formulation is illustrative of such use:

|  | Parts |
| --- | --- |
| Peacock blue pigment | 30 |
| Example 1 resin | 35 |
| Diethylene glycol | 35 |

The resin is dissolved in the glycol to provide a 50% solids vehicle. The pigment is then added and the mixture is given three passes through a conventional 3-roll mill. The resulting ink can be applied to paper and set immediately by the use of steam in accordance with the practice of the art.

Any of the resins of this invention may be employed in combination with suitable glycols and in various proportions in accordance with the practice in this art to provide moisture-setting printing ink compositions. Any of the normally liquid glycols which are customarily used in this art may be employed. For example, the alkylene glycols such as ethylene glycol, propylene glycol, butylene glycol, etc., or the polyalkylene glycols such as diethylene glycol, triethylene glycol, tetraethylene glycol, nonaethylene glycol, dipropylene glycol, etc., may be employed. Any water-insoluble coloring matter such as dyes and pigments may be incorporated in the resin solution to provide the finished ink.

Moisture-setting printing inks containing the resins of this invention can be precipitated or "set" substantially immediately by the application of water or steam in accordance with the methods known to the art. The inks evidence no reactivity between the resin and normally reactive pigments such as orange mineral and peacock blue as shown by the fact that they remain homogeneous and do not increase in viscosity with age. Currently used inks in the moisture-setting ink field contain highly acidic resins such as the rosin-fumaric acid or terpene-maleic anhydride resins which react with many of the desirable pigments. Another important characteristic of moisture-setting inks containing the subject resins is their higher viscosity as compared with inks containing a like amount of the resins currently used in this art. Thus, moisture-set inks containing the subject resins have better "hold out" properties.

Films deposited by moisture-setting inks containing the subject resins are unusually tough and exhibit good flexibility, thus eliminating the commercial practice of modification of the inks with alkyd resins and/or nitrocellulose to improve these characteristics. The films, furthermore, have markedly less tack than is obtained with many of the currently used highly acidic resin-containing inks. At the same time, the films deposited from inks containing these resins are highly resistant to deterioration on exposure to high humidities; i. e., they have good water resistance. The ink films also exhibit good adhesion to paper and other supporting surfaces and are scuff-resistant.

Another use for the subject resins is in the field of aniline inks. Aniline inks utilize a highly volatile solvent, such as ethyl alcohol to achieve quick drying characteristics. A typical formulation using the resin of Example 1 is as follows:

|  | Parts |
| --- | --- |
| Dye solution | 40 |
| Tannic acid solution | 4 |
| Resin of Example 1 | 5 |

The dye solution is prepared by dissolving 2 parts of rhodamine in a mixture of 2 parts of acetic acid and 36 parts of ethyl alcohol. The tannic acid solution consists of 2 parts of tannic acid and 2 parts of ethyl alcohol. The resin solution contains 2 parts of the resin and 3 parts of ethyl alcohol.

This ink when applied to paper exhibited fast drying characteristics. The dried film was water-resistant and abrasion resistant. The viscosity stability of the ink was very good and much superior to that of inks formulated on the basis of dewaxed shellac.

The resins of this invention may also be used in the formulation of compositions suitable for the manufacture of phonograph records of the type which contain a filler. In such compositions, the binder may be made up solely of the resins of this invention, or the binder may be composed of the subject resins modified with various proportions of film-formers or diluent resins or both. Thus, to make compositions suitable for phonograph record manufacture, a binder is prepared on the basis of from 5 to 100% of the resins of this invention, from 0 to 90% of a film-former such as the film-forming vinyl resins as polyvinyl acetate, polyvinyl formal, polyvinyl butyral, vinyl acetate-chloride copolymers, vinyl chloride-vinylidene chloride copolymers, etc., shellac, cellulose acetate, ethyl cellulose, polyisobutylene, poly(2-chlorobutadiene-1,3), butadiene-styrene copolymers, butadiene-acrylonitrile copolymers, etc., and from 0 to 90% of diluent resins such as Vinsol (a petroleum hydrocarbon insoluble resin obtained from pine wood stumps), rosin, rosin esters, ethylenic hydrocarbon polymers, polynuclear aromatic hydrocarbon resins obtained as by-products in water gas manufacture (Resinex), coumarone-indene polymers, etc. Minor amounts of waxes, lubricants or plasticizers may be added as desired. A moldable composition is then made on the basis of 10–40% binder and 60–90% filler such as clay, whiting, slate flour, etc. The resulting compositions exhibit excellent workability and flow characteristics. By suitably adjusting the types and proportions of the aforementioned ingredients, compositions may be obtained which are suitable for the manufacture of floor tiles.

Of the various phonograph record compositions mentioned above, those prepared from the resins of this invention, a film-forming vinyl resin and a diluent resin such as Vinsol are particularly important. One such composition is the following:

|  | Parts |
| --- | --- |
| Vinyl acetate-chloride copolymer | 168 |
| Resin of Example 1 | 77 |
| Vinsol | 235 |
| Carnauba wax | 30 |
| Zinc stearate | 6 |
| Filler | 1,500 |
| Carbon black | 20 |

These materials were compounded in accordance with the usual procedure of the art. In molding the resulting composition under heat and pressure, it was found that it exhibited exceptionally good flow characteristics, in this respect much improved over similar compositions not containing the resin of Example 1. The resulting record possessed high flexural strength and had excellent wearing properties.

The subject resins may also be used in conjunction with ethyl cellulose in the preparation of lacquers. Desirable protective coatings can also be prepared by combining the resins with suitable proportions of other film-formers such as cellulose acetate, polyvinyl acetate and polyvinyl butyral. Certain of the resins are also compatible with nitrocellulose and are useful in the formulation of nitrocellulose lacquers.

The thermosetting resins of this invention are useful as binders for glass wool. For example, an emulsion may be made by dissolving the resin in butanol and emulsifying the resulting solution in a colloid mill with an aqueous ammonium caseinate solution. The finished emulsion is adjusted to about 40% solids by the addition of water and then used to impregnate glass wool by spraying it on the fibers, pressing the treated fibers into bats and heat-treating the bats until the resin has thermoset. The thermosetting resins can also be ground up and combined with a suitable filler for use as a molding powder. Solutions of the resin may be used as laminating varnishes for application to wood, paper, cloth, etc.

The term "soluble," as used in this specification and in the claims, is used in the broad sense to define that characteristic of a substance whereby, upon contact with a liquid, it is dispersed therein to form a permanent dispersion thereof, whether or not the dispersion is crystal clear.

All parts and percentages in the specification and claims are by weight unless otherwise mentioned.

What I claim and desire to protect by Letters Patent is:

1. A hard resin obtained by heating simultaneously ingredients comprising phenol, formaldehyde and a normally liquid monohydric alcohol ester of a rosin acid, in the presence of an acid condensation catalyst, at a temperature sufficiently high to cause an exothermic reaction to take place, for a period such that the formaldehyde has been reacted substantially entirely, the proportions of the reactants employed being defined by the area ABEF of Figure 1, and thereafter dehydrating the reaction product by heating until a product is obtained which is a hard resin at normal room temperature, the monohydric alcohol residue of said ester of a rosin acid being free of substituents which are reactive under the conditions of the reaction, said hard resin being characterized by solubility in ethyl alcohol and dipropylene glycol and by insolubility in drying oils, aliphatic and aromatic hydrocarbons.

2. A hard thermoplastic resin obtained by heating simultaneously in an aqueous medium phenol, formaldehyde and a normally liquid monohydric alcohol ester of a rosin acid, in the presence of an acid condensation catalyst, at a temperature sufficiently high to cause an exothermic reaction to take place, for a period such that the formaldehyde has been reacted substantially entirely, the proportions of the reactants employed being defined by the area CDEF of Figure 1, and thereafter dehydrating the reaction product by heating until a product is obtained which is a hard resin at normal room temperature, the monohydric alcohol residue of said ester of a rosin acid being free of substituents which are reactive under the conditions of the reaction, said hard resin being thermoplastic and characterized by solubility in ethyl alcohol and dipropylene glycol and by insolubility in drying oils, aliphatic and aromatic hydrocarbons.

3. A hard thermosetting resin obtained by heating simultaneously in an aqueous medium phenol, formaldehyde and a normally liquid monohydric alcohol ester of a rosin acid, in the presence of an acid condensation catalyst, at a temperature sufficiently high to cause an exothermic reaction to take place, for a period such that the formaldehyde has been reacted substantially entirely, the proportions of the reactants employed being defined by the area ABCD of Figure 1, and thereafter dehydrating the reaction product by heating until a product is obtained which is a hard resin at normal room temperature, the monohydric alcohol residue of said ester of a rosin acid being free of substituents which are reactive under the conditions of the reaction, said hard resin being thermosetting and characterized by solubility in ethyl alcohol and dipropylene glycol and by insolubility in drying oils, aliphatic and aromatic hydrocarbons.

4. A hard thermoplastic resin obtained by heating simultaneously in an aqueous medium, phenol, formaldehyde and the methyl ester of a rosin acid, in the presence of an acid condensation catalyst, at a temperature sufficiently high to cause an exothermic reaction to take place, for a period such that the formaldehyde has been reacted substantially entirely, the proportions of the reactants employed being defined by the area CDEF of Figure 1, and thereafter dehydrating the reaction product by heating at a temperature of from about 100° C. to about 350° C. until a product is obtained which is a hard resin at normal room temperature, said hard resin being thermoplastic and characterized by solubility in ethyl alcohol and dipropylene glycol and by insolubility in drying oils, aliphatic and aromatic hydrocarbons.

5. A hard thermosetting resin obtained by heating simultaneously in an aqueous medium phenol, formaldehyde and the methyl ester of a rosin acid, in the presence of an acid condensation catalyst, at a temperature sufficiently high to cause an exothermic reaction to take place, for a period such that the formaldehyde has been reacted substantially entirely, the proportions of the reactants employed being defined by the area ABCD of Figure 1, and thereafter dehydrating the reaction product by heating at a temperature of from about 100° C. to about 250° C. until a product is obtained which is a hard resin at normal room temperature, said hard resin being thermosetting and characterized by solubility in ethyl alcohol and dipropylene glycol and by insolubility in drying oils, aliphatic and aromatic hydrocarbons.

6. The method of preparing a hard resin which comprises heating simultaneously in an aqueous medium phenol, formaldehyde and a normally liquid monohydric alcohol ester of a rosin acid, in the presence of an acid condensation catalyst, at a temperature sufficiently high to cause an exothermic reaction to take place, for a period such that the formaldehyde has been reacted substantially entirely, the proportions of reactants employed being defined by the area ABEF of Figure 1, dissolving the reaction product in an aliphatic monohydric alcohol of from 4 to 6 carbon atoms, and thereafter distilling the resulting solution to remove the alcohol and water as azeotropes, distillation being continued until a product is obtained which is a hard resin at normal room temperature, the monohydric alcohol residue of said ester of a rosin acid being free of substituents which are reactive under the conditions of the reaction.

7. A moisture-setting printing ink comprising water-insoluble coloring matter dispersed in a vehicle comprising the resin of claim 1 and a normally liquid glycol of the class consisting of alkylene glycols and polyalkylene glycols.

8. A hard resin obtained by heating simultaneously in an aqueous medium phenol, formaldehyde and the methyl ester of a rosin acid, in the presence of an acid condensation catalyst, at a temperature sufficiently high to cause an exothermic reaction to take place, for a period such that the formaldehyde has been reacted substantially entirely, the proportions of the reactants employed being defined by the area ABEF of Figure 1, and thereafter dehydrating the reaction product by heating until a product is obtained which is a hard resin at normal room temperature, said hard resin being characterized by solubility in ethyl alcohol and dipropylene glycol and by insolubility in drying oils, aliphatic and aromatic hydrocarbons.

WILLIAM D. JONES.

REFERENCES CITED

The following references are of record in the file of this patent:

UNITED STATES PATENTS

| Number | Name | Date |
|---|---|---|
| 2,299,135 | Erickson et al. | Oct. 20, 1942 |
| 2,356,789 | Holzimer et al. | Aug. 29, 1944 |
| 2,380,307 | Haroldson | July 10, 1945 |